United States Patent [19]

Vogel et al.

[11] Patent Number: 4,497,078

[45] Date of Patent: Feb. 5, 1985

[54] APPARATUS FOR PREVENTING THE TRANSMISSION OF VIBRATIONS

[76] Inventors: Jerald M. Vogel, R.R. 4; Steven J. Hooper, 4329 L-Swing #20; Jerry L. Hand, R. R. 3, all of Ames, Iowa 50010

[21] Appl. No.: 466,089

[22] Filed: Feb. 14, 1983

[51] Int. Cl.³ .............................................. A47C 19/16
[52] U.S. Cl. ........................................ 5/118; 248/550; 248/583
[58] Field of Search ....................... 5/118; 248/59, 550, 248/562, 583, 631, 638

[56] References Cited

U.S. PATENT DOCUMENTS

| | | | |
|---|---|---|---|
| 3,299,447 | 1/1967 | Dome | 5/118 |
| 3,371,359 | 3/1968 | Dome | 5/118 |
| 3,612,599 | 10/1971 | Sternberg | 5/118 |
| 3,682,431 | 8/1972 | Vivian | 248/631 |
| 3,760,436 | 9/1973 | Zach et al. | 5/118 |
| 3,858,903 | 1/1975 | Henry et al. | 280/124 F |
| 3,882,558 | 5/1975 | Christensen | 5/118 |
| 3,902,205 | 9/1975 | Bell | 5/118 |
| 3,938,770 | 2/1976 | Turner et al. | 248/550 |
| 4,078,269 | 3/1978 | Weipert | 5/63 |
| 4,107,797 | 8/1978 | Maxwell, Sr. | 5/118 |
| 4,144,601 | 3/1979 | Anderson et al. | 5/118 |
| 4,196,483 | 4/1980 | Lefler et al. | 5/118 |
| 4,384,700 | 5/1983 | Thompson et al. | 248/550 |

Primary Examiner—Gary L. Smith
Assistant Examiner—Michael F. Trettel
Attorney, Agent, or Firm—Henderson & Sturm

[57] ABSTRACT

An apparatus for preventing the transmission of vibrations from one object to another including a first and second frame having a rod attached to one of the frames and the other being slideably mounted to the rod. An air bag or other force transmitting mechanism is attached to one end thereof to one of the frames and abuts the other of the frames. A source of fluid is provided for pushing the first and second frames apart when such fluid is allowed to flow into the force transmitting apparatus. A biasing structure is provided for causing the frames to move closer together when fluid is allowed to escape from the force transmitting apparatus and a valve structure is connected between the fluid supply and force transmitting apparatus for selectively controlling the flow of the fluid between the air bag, a source of pressurized fluid and atmosphere. A third frame, a second rod, a second force transmitting apparatus, biasing apparatus and valve and valve actuating mechanism are also provided for isolating transmissions of force in a similar fashion, but in a direction transverse to the direction of movement of the first and second frame referred to immediately above.

15 Claims, 8 Drawing Figures

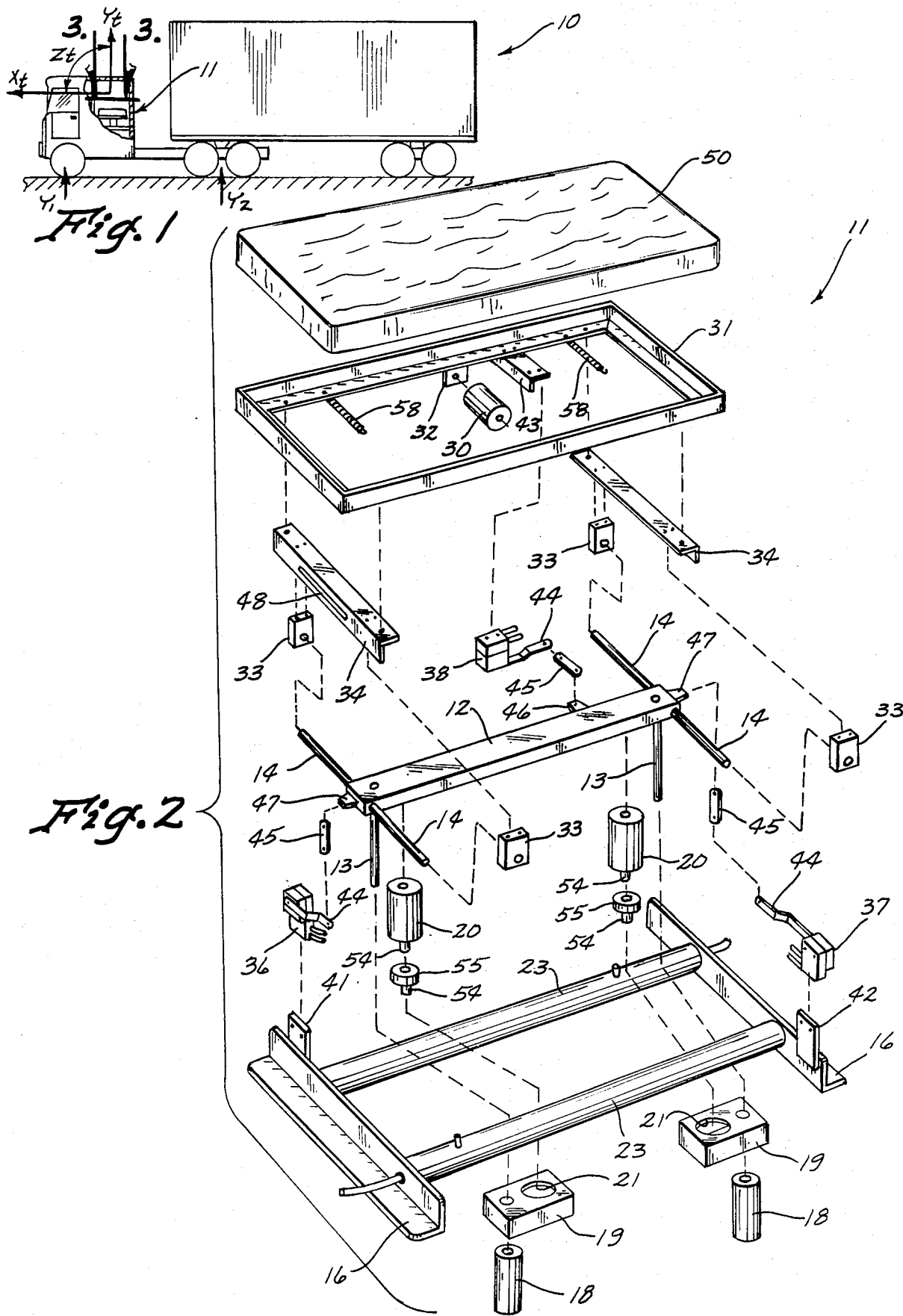

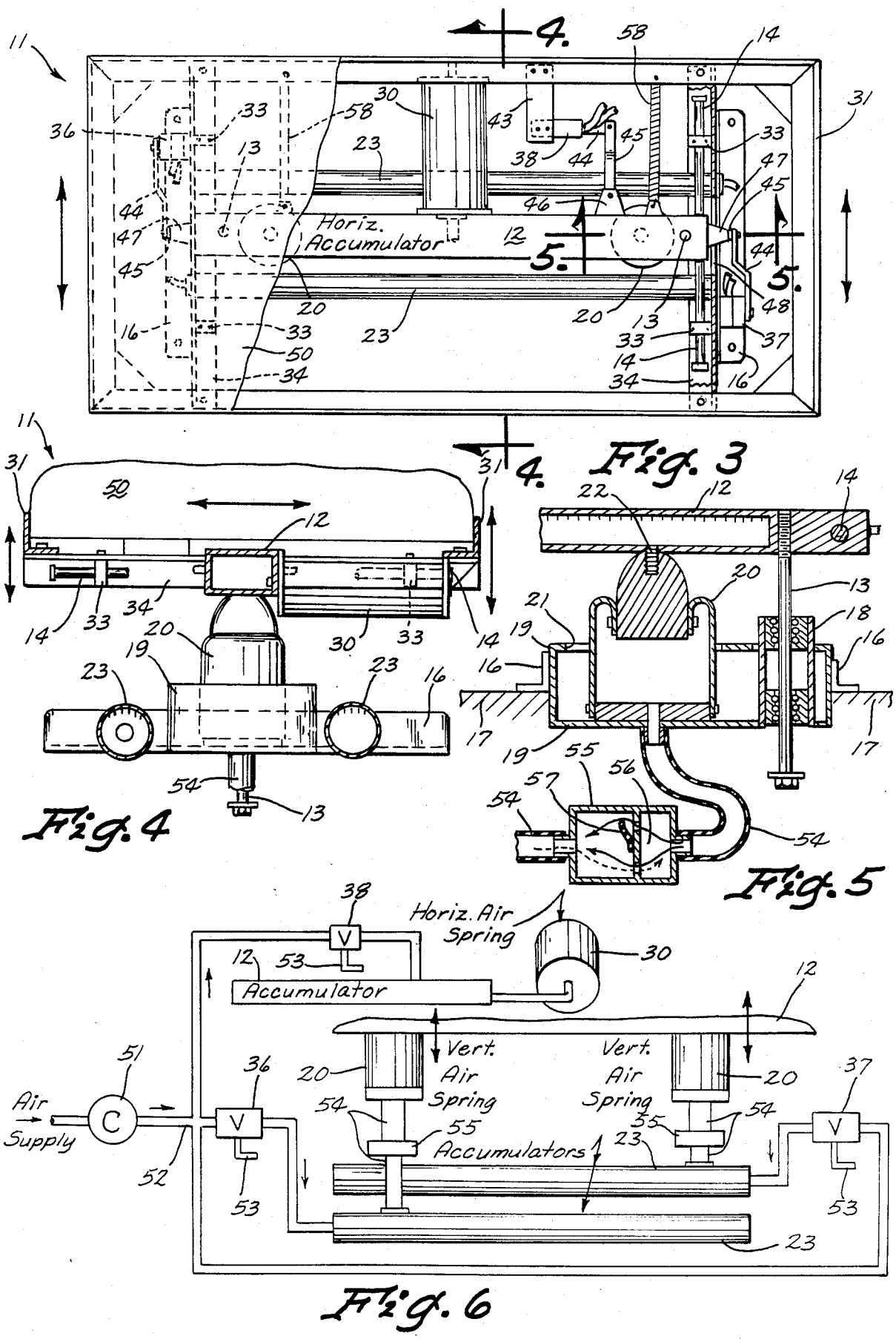

APPARATUS FOR PREVENTING THE TRANSMISSION OF VIBRATIONS

BACKGROUND OF THE INVENTION

The present invention relates to an apparatus for preventing transmission of vibrations from one frame or platform to another. Structures of this type are needed for various reasons, for example for use in pallets for moving electronic equipment which is fragile, for seats in vehicles and, as will be explained below with regard to the preferred embodiment of this invention, in an isolation sleeper bunk for use in semi-trailer trucks.

Tractor-trailer trucks for hauling loads long distances usually have a portion of the tractor thereof which has a sleeping compartment therein. Typically these sleeping compartments are comprised merely of a space with a sheet metal floor whereby a mattress or the like can be placed on such sheet metal floor. Consequently, two drivers can be used as a team in a trucking operation whereby one of the drivers can sleep in the sleeping compartment while the other person drives, thereby keeping the truck moving for days at a time without stopping except for refueling or the like.

A problem, however, is that the sleeping conditions are not ideal. The major reason for this problem is that the vibrations of the vehicle make it extremely difficult for persons to sleep in sleeping compartments while the vehicle is moving. This problem is well-known and there have been many attempts to solve it; for example see U.S. Pat. Nos. 4,196,483; 4,144,601; 3,760,436; 3,612,599; 3,371,359; and 3,299,447. These prior art systems, however, tend to be unduly complicated, expensive to produce and not altogether ideal from the standpoint of actually preventing transmission of vibrations from semi-trailer trucks to the bed itself.

To analyze the problem, attention is directed to FIG. 1 which shows a tractor-trailer rig. For the purpose of this analysis, it is assumed that the tractor is a rigid body. Vertical translations at the axles $Y_1$ and $Y_2$ result in translations $X_t$ and $Y_t$ of the sleeper compartment passenger, as well as rotation about the $Z_t$ axis. The problem of the prior art is to provide a design to isolate the sleeper compartment occupant from excitations in the $X_t$ and $Y_t$ directions.

One of the problems with the devices of the prior art is that the apparatus works differently depending upon the weight of the person supported on the mattress. Consequently, there is a need for a device which will provide the required stiffness, damping and stroke to minimize the force transmitted to the occupant and which automatically adjusts the bunk position to the design height and the design for/aft position regardless of the amount of supported weight.

Another problem with prior art designs of this type is that when the tractor hits a bump in the road, the occupant tends to be launched into the air with the mattress and associated structure. Consequently, there is a need to provide a device of this type which includes an anti-launch mechanism for attenuating the tendency for an air spring system to launch the occupant following complete compression caused by a severe bump encountered by the truck.

SUMMARY OF THE INVENTION

The present invention relates to an apparatus for preventing the transmission of vibrations from one object to another including a first and second frame having a rod attached to one of the frames and the other being slideably mounted to the rod. An air bag or other force transmitting mechanism is attached to one end thereof to one of the frames and abuts the other of the frames. A source of fluid is provided for pushing the first and second frames apart when such fluid is allowed to flow into the force transmitting apparatus. A biasing structure is provided for causing the frames to move closer together when fluid is allowed to escape from the force transmitting apparatus and a valve structure is connected between the fluid supply and force transmitting apparatus for selectively allowing the flow of the fluid to flow selectively from the fluid supply means to the force transmitting apparatus in one position thereof, from the force transmitting apparatus to atmosphere in a second position thereof, or to allow no flow at all to or from the force transmitting apparatus in the third position of the valve. Structure is also operatively connected to the valve for causing the valve to be in a third position thereof when the frames are at a predetermined distance apart, at the first position thereof when the frames are closer together than the predetermined distance, and at the second position when the frames are farther apart than the predetermined distance. This aforementioned structure isolates vibrations from one frame to another in one direction.

A further improvement of the invention provides structure including a third frame, a second rod, a second force transmitting apparatus, biasing apparatus and valve and valve actuating mechanisms for isolating vibrations in a direction transverse to the first said rod. Accumulators are provided for each force transmitting mechanism for driving the natural frequency of the force transmitting mechanism below the natural excitation frequency imposed on one of the frames.

An object of the present invention is to provide an improved apparatus for preventing transmission of vibrations from one object to another.

Another object of the invention is to provide an apparatus of the type mentioned above including an anti-launch feature.

A futher object is to provide an apparatus of the type mentioned above which functions substantially the same way regardless of the amount of weight disposed thereon.

Other objects, advantages and novel features of the present invention will become apparent from the following detailed description of the invention when considered in conjunction with the accompanying drawings.

BRIEF DESCRIPTION OF THE DRAWINGS

FIG. 1 is a side elevational view of a tractor-trailer truck having a portion of the cab cut away to show a sleeping compartment therein;

FIG. 2 is an exploded perspective view of a preferred embodiment of the present invention;

FIG. 3 is a top view of the preferred embodiment shown in FIG. 2, with portions cut away to show the underlying structure;

FIG. 4 is an enlarged cross-sectional view taken along line 4—4 of FIG. 3;

FIG. 5 is an enlarged cross-sectional view taken along line 5—5 of FIG. 3;

FIG. 6 is a schematic view of the fluid circuit of the present invention;

DESCRIPTION OF THE PREFERRED EMBODIMENT

Figure 7:
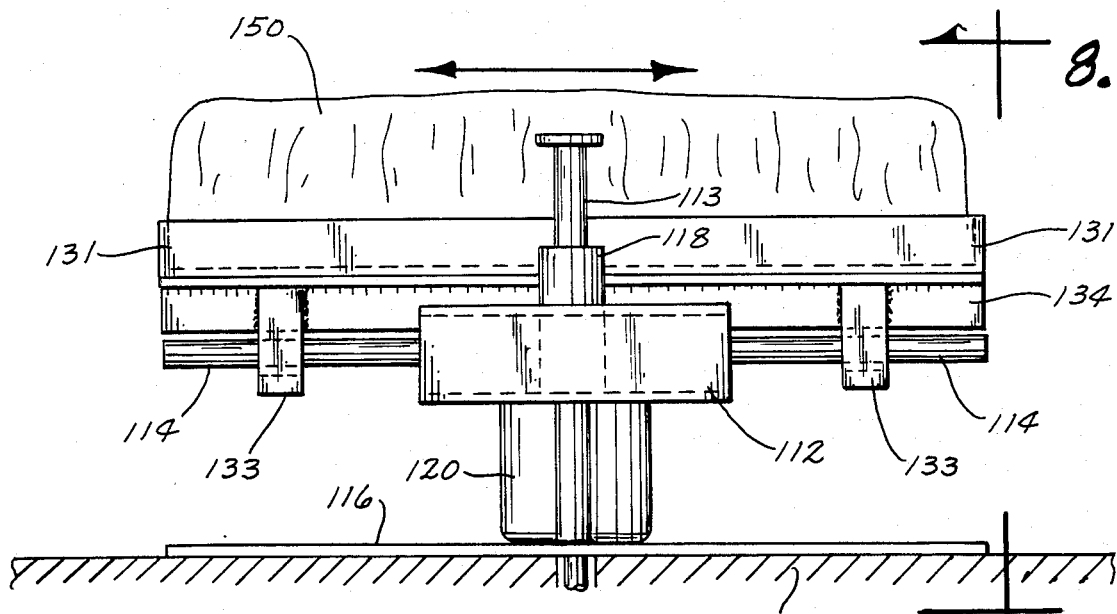
FIG. 7 is a side elevational view, similar to FIG. 4, but showing another preferred embodiment of the present invention.

Referring to FIG. 2, a first frame 12 is provided and has an air space disposed therein to provide an accumulator as can be seen schematically on FIG. 6. A first pair of rods or hardened shafts 13 extend downwardly from the first frame 12 and a second pair of rods 14 extend in each direction from the frame 12 in a horizontal direction, transversely disposed with respect to the first pair of rods 13. A second frame 16 is shown attached to the sheet metal floor 17 of a truck sleeper compartment, FIG. 5.

Vertical linear bushings 18 are disposed within bushing housings 19 as can readily be seen in FIGS. 2 and 5. The vertical shafts 13 are rigidly fixed with respect to the frame 12, for example by means of threads. An air bag 20 is attached by a threaded fastener 22 to the frame 12 at the top thereof, for example as seen in FIG. 5, and is attached to the vertical motion bushing housing 19 at the bottom thereof through the opening 21 in bushing housings 19. The second frame 16 also includes accumulators 23 attached thereto which provide rigidity and also provide additional air volume as will be described below.

A third air bag structure 30 is disposed horizontally and is otherwise identical in structure to the vertical air bags 20. This horizontally disposed air bag 30 is attached to the third frame 31 by a bracket and fastener 32 at one end thereof and to the second frame 12 at the other end thereof as is shown in FIG. 4. Bearings 33 are attached to the angle aluminum 34 which angle aluminum 34 are rigidly attached to the third frame 31 as can readily be seen in FIGS. 2 and 4. Valves 36, 37 and 38 are of the general type shown in U.S. Pat. Nos. 3,858,903 and 3,884,454, which patents are incorporated herein by reference. The valve 36 is attached by a bracket 41 to one side of the frame 16 and controls the flow into the left most air bag 20, as shown in FIG. 2. The valve 37 is attached to a bracket 42 on the other side of the frame 16 and controls the other vertical air bag 20.

The valve 38, is attached to a bracket 43, rigidly attached to the third frame 31, and then through a control mechanism 44 and 45 to the second frame 12 by a bracket 46. Similarly, the valves 36 and 37 have identical control arms 44 and linkage members 45 which attach to end members 47 on the second frame 12. These end members 47 extend through slots 48 in each of the brackets 34. A mattress 50 is disposed within and on top of the third frame 31 for providing a sleeping surface.

Referring now to FIG. 6, it is noted that a supply of air is provided, and a pump or compressor 51 supplies this air under pressure to a pipe 52, which leads to each of the valves 36, 37 and 38. In turn, these valves 36-38 have passageways 53 leading to atmosphere and other port which leads to a respective one of the accumulators 12 or 23. The vertical air bags 20 are in fluid communication with the accumulators 23 through pipes 54 and flow control mechanisms 55.

Referring now to the operation of the preferred embodiment of the present invention as shown in FIGS. 2 through 6, it is noted that a predetermined position of the frame 31 with respect to the frame 16 is set by positioning the lever 44 of the valves 36 and 37 in a shut-off position, whereby no flow is allowed to go between the compressor 51 and the air bags 20. This predetermined position is essentially set by providing the proper length of linkage 45 between the lever 44 and the member 47 on the first frame 12. For the purposes of this operation, assume that a person lies down on the mattress 50. When this occurs, the first and third frames will move downwardly toward the second frame 16, thereby moving the levers 44 on the valves 36 and 37 downwardly. After a five second delay, due to the construction of the valves 36 and 37 as referred to in patents referred to above, the flow from the air supply will flow into the respective accumulators 23, through the tubes 54 and through the orifice members 55 having openings 56 therein into the inside of the air bags 20, thereby causing the first and third frames 12 and 31 to be pumped back upwardly with respect to the second frames 16. Once the original predetermined position of the first and third frames 12 and 31 have been achieved, the lever 44 will have also moved upwardly with the first frame 12 to the shut-off position and the person lying on the mattress 50 will be in an identical vertical position as when he first laid on the mattress 50, with respect to the second frame 16. Accordingly, it can be appreciated that regardless of how heavy the person is that lays on the mattress 50, the first frame will be pumped up by whatever pressure required in the air bags 20 to move such person back up to the neutral position, because only after that predetermined position is reached will the valves 36 and 37 be shut-off.

It is noted that the first frame is biased towards the second frame 16 by gravity, but that springs or the like could also be used if desired.

Similarily, the tension springs 58 used in conjunction with the horizonatally disposed air bag 30 are used to maintain third frame 31 at a predetermined distance from the first frame 12. The tension springs 58 pull on the first frame 12, and the air within the air bag 30 tends to transmit a force on the first frame 12 in an opposite direction from the force of the springs 58. Consequently, the central or predetermined distance of the first frame 12 with respect to the third frame 31 is set by providing the proper length of linkage 45 between the arm 44 of valve 38 and the connection 46 on the first frame 12, whereby in such centered position the handle 44 will move the valve 38 to a shut-off position wherein there will be no flow from the air pressure source and also the air within the bag 30 is not allowed to escape through the atmosphere 53 of the valve 38.

Once the tractor-trailer truck is travelling down the road and a person is on the mattress 50, the motions tending to cause the first and third frames 12 and 31 and the mattress 50 to move upwardly will be resisted, through the five second delay referred to, above by gravity and by the orifice structure 55 which has only one of the orifices 56 available to allow air flow therethrough in such event. For example, the dashed line shown in FIG. 5 illustrates that approximately half as much of an opening for air is allowed to pass through in a direction to allow the air bag to expand as is the case when air needs to escape from the air bag 20. Without this orifice structure 55, the system would tend to launch the bed frame vertically in a quite undesirable fashion.

The increase in damping is accomplished by the opening of a large orifice when the air bags compress air into the accumulators, and the small orifice when the accumulators allow air flow back into the air bags. On the downward side, when forces tend to move the first frame 12 downwardly with respect to the second frame 16, the valves 36 and 37 will be moved to connect the air supply with the accumulators 23 and the air bags 20, again through such five second delay so as to move the first frame upwardly again to the neutral position until the levers 44 shut off the air flow through the valves 36 and 37. In summary, it is noted that the valves 36 and 37 selectively allow air to flow from the air supply means, through the accumulator to the air bag 20 in one position thereof, from the air bag to atmosphere in a second position, thereof, or allow no flow at all to or from the air bag in a third and neutral preset position.

If the forces within the truck tend to throw the third frame forwardly with respect to the first frame 12, then the lever 44 on the valve 38 will move causing, through a five second delay, some of the air to be released out of the air bag 30 to atmosphere, thereby allowing the springs 58 to pull the third frame 31 back to the neutral position with respect to the first frame, i.e. back to a predetermined distance between the first frame 12 and third frame 31.

If the forces for and aft tend to cause the third frame 31 to move rearwardly from the preset position corresponding to having a predetermined distance between the first frame 12 and the third frame 31, then the lever 44 will be moved such that the valve 38 will connect the air supply to an accumulator within the first frame 12, to the inside of the air bag 30, thereby causing the air bag 30 to push the first frame 12 back to the predetermined position and against the bias of the springs 58 until such time that the lever 44 is moved back to the neutral position, representing a condition that the third frame 31 is again in a predetermined distance from the first frame 12.

Figure 8:
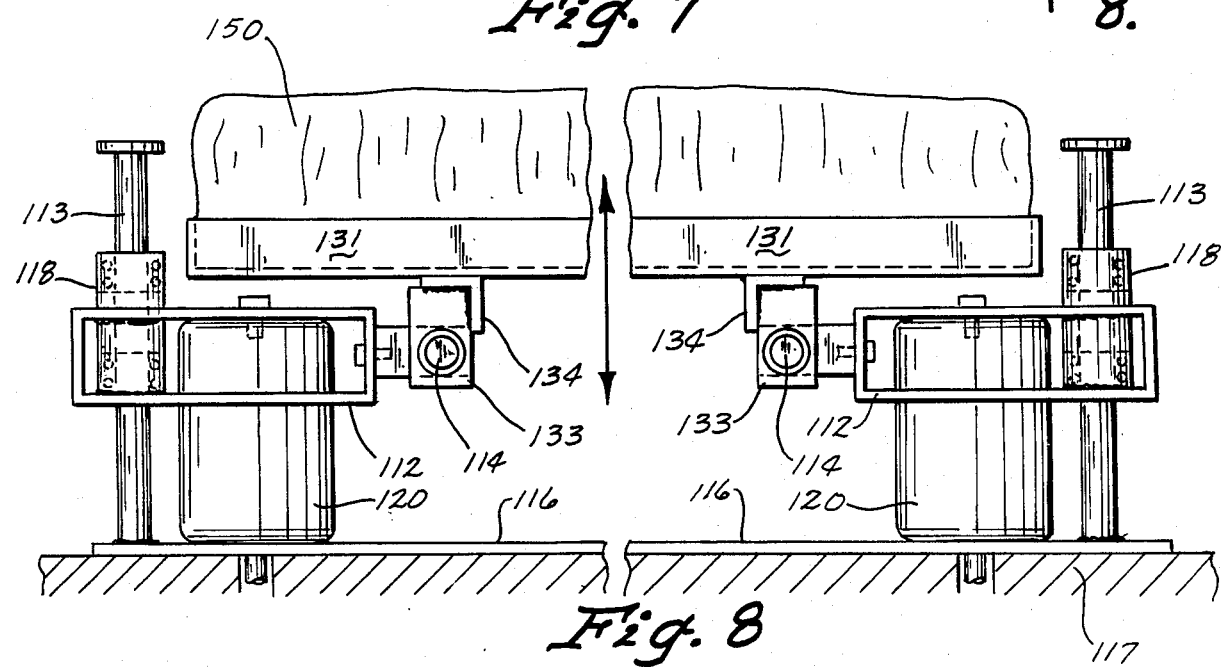
FIG. 8 is a side elevational view taken along line 8—8 of FIG. 7.

Referring now to the embodiment of FIGS. 7 and 8, it is noted that one hundred series numbers are used for the elements shown in this embodiment and that the last two digits of such one hundred series numbers correspond to similar or identical parts in the embodiment of FIGS. 2 and 6 and that these elements operate essentially identically as disclosed above with respect to their counterparts in FIGS. 2–6. The only basic difference between the embodiment of FIGS. 7 and 8 and the embodiment previously discussed in detail is that the first frame 112 does not have the vertical rods or hardened shafts 113 attached rigidly thereto, but instead has these hardened shafts 113 rigidly attached to the second frame 116. These preferred embodiments essentially show the equivalency of connecting the hardened shafts to one frame or the other. The embodiment of FIGS. 7 and 8 provides the additional advantage that no large openings need to be cut into the sheet metal floor 117 of the sleeping compartment cab as is necessary with the embodiment shown in FIGS. 2–6.

Accordingly, it is believed to be clear that the objects referred to above are achieved by use of the preferred embodiment disclosed herein. Obviously many modifications and variations of the present invention are possible in light of the above teachings. It is therefore to be understood that, within the scope of the appended claims, the invention may be practiced otherwise than as specifically described.

We claim:

1. Apparatus for preventing the transmission of vibrations from one object to another comprising:

a first frame;
a second frame;
a rod attached to one of said first frame and said second frame;
bushing means for slideably receiving said rod, said bushing means being adapted to be attached to the other of said frames;
fluid supply means for supplying a compressible, nonhydraulic fluid under pressure;
force transmitting means attached at one end thereof to one of said frames for sealingly receiving said fluid under pressure;
abutment means associated with said other frame for contacting the other end of said force transmitting means for causing said frames to be pushed apart when fluid under pressure is allowed to enter said force transmitting means;
means for causing said frames to move closer together when fluid pressure is relieved in said transmitting means;
valve means connected between said fluid supply means and said force transmitting means for selectively allowing the fluid to flow selectively from said fluid supply means to said force transmitting means in one position thereof, from said force transmitting means to atmosphere in a second position thereof or to allow no flow at all to or from said force transmitting means in a third position of said valve means;
means operatively connected to said valve means for causing said valve means to be at said third position thereof when said frames are a predetermined distance apart, at said first position thereof when said frames are closer together than said predetermined distance and at said second position when said frames are farther apart than said predetermined distance;
a third frame;
a second rod operatively attached to one of said first and third frames, said second rod being disposed transversely with respect to the first said rod;
second force transmitting means operatively attached at one end thereof to said frame at one end thereof and to said third frame at the other end thereof;
second bushing means operatively attached to the one of said first and third frames which does not have a second rod attached thereto for slideably receiving said second rod;
means for causing said first and third frames to move closer together when fluid pressure is relieved in said second force transmitting means;
second valve means for selectively connecting said second force transmitting means to said fluid supply means in a first position thereof, from said second force transmitting means to atmosphere in a second position thereof or to allow no flow at all to or from said second force transmitting means in a third position thereof; and
means connected to said second valve means for causing said second valve means to be at said third position thereof when said first and third frames are a predetermined distance apart, at said first position thereof when said first and third frames are closer together than said predetermined distance thereof and at said second position thereof when said first and third frames are farther apart than said predetermined distance thereof.

2. Apparatus as defined in claim 1 including accumulator means in fluid communication with said valve means and said force transmitting means for increasing the effective fluid volume of said force transmitting means thereby driving the natural frequency of the force transmitting means below the natural excitation frequency imposed upon one of said frames.

3. Apparatus as defined in claim 2 including fluid flow means connected between said force transmitting means and said accumulator for allowing fluid to exit from said force transmitting means to said accumulator means at a faster rate than fluid can enter said force transmitting means from said accumulator means.

4. Apparatus as defined in claim 1 including a separate accumulator means in fluid communication with each respective of said force transmitting means and each respective valve means for increasing the respective effective fluid volume of said respective force transmitting means, thereby driving the natural excitation frequency of the respective force transmitting means below the natural excitation frequency imposed upon the second frame.

5. Apparatus as defined in claim 1 including a separate fluid flow means connected between each of said force transmitting means and each respective accumulator means for causing a larger fluid flow passageway therebetween when fluid is flowing from said respective force transmitting means to said respective accumulator means than when fluid is flowing from said respective accumulator means to said respective force transmitting means.

6. Apparatus as defined in claim 5 wherein said force transmitting means are air bags.

7. Apparatus as defined in claim 1 including a third rod, bushing means, valve means and force transmitting means identical in all material respects to the first said rod, bushing means, valves means and force transmitting means.

8. Apparatus as defined in claim 1 wherein said means for causing said frames to move closer together is gravity and the weight of the uppermost frame.

9. Apparatus as defined in claim 1 wherein said means for causing the first and second frames to move closer together is gravity and the means for causing the first and third frames together is a spring.

10. Apparatus as defined in claim 1 wherein each of said valve means includes means for causing a time delay from one of said positions to another thereof.

11. Apparatus as defined in claim 1 wherein said second frame is connected to a truck and said third frame includes means for receiving a mattress.

12. Apparatus as defined in claim 11 wherein the first said rod is vertically disposed and said second rod is horizontally disposed.

13. Apparatus for preventing the transmission of vibrations from one object to another comprising:
  a first frame;
  a second frame adapted for attachment to said one object;
  means for operatively attaching said first frame to said second frame;
  a third frame;
  a rod operatively attached to one of said first and third frames;
  fluid supply means for supplying a compressible, nonhydraulic fluid under pressure;
  force transmitting means operatively attached at one end thereof to said first frame at one end thereof and to said third frame at the other end thereof;
  bushing means operatively attached to the one of said first and third frames which does not have a said rod attached thereto, for slideably receiving said rod;
  means for causing the one end of said first and third frames to move closer together when fluid pressure is relieved in said force transmitting means;
  valve means for selectively connecting said force transmitting means to said fluid supply means in a first position thereof, from said force transmitting means to atmosphere in a second position thereof or to allow no flow at all to or from said force transmitting means in a third position thereof;
  means connected to said valve means for causing said valve means to be at said third position thereof when said one end of said first frame and said third frame are a predetermined distance apart, at said first position thereof when said one end said first frame and said third frame are closer together than said predetermined distance thereof and at said second position thereof when said one end of first frame and said third frame are farther apart than said predetermined distance thereof;
  accumulator means in fluid communication with said valve means and said force transmitting means for increasing the effective fluid volume of said force transmitting means, thereby driving the natural frequency of the force transmitting means below the natural excitation frequency imposed upon one of said frames; and
  fluid flow means connected between said force transmitting means and said accumulator for allowing fluid to exit from said force transmitting means to said accumulator means at a faster rate than fluid can enter said force transmitting means from said accumulator means.

14. Apparatus for preventing the transmission of vibrations from one object to another comprising:
  a first frame;
  a second frame;
  a rod attached to one of said first frame and said second frame;
  bushing means for slideably receiving said rod, said bushing means being adapted to be attached to the other of said frames;
  fluid supply means for supplying a compressible, nonhydraulic fluid under pressure;
  force transmitting means attached at one end thereof to one of said frames for sealing receiving said fluid under pressure; abutment means associated with said other frame for contacting the other end of said force transmitting means for causing said frames to be pushed apart when fluid under pressure is allowed to enter said force transmitting means;
  means for causing said frames to move closer together when fluid pressure is relieved in said force transmitting means;
  valve means connected between said fluid supply means and said force transmitting means for selectively allowing the fluid to flow selectively from said fluid supply means to said force transmitting means in one position thereof, from said force transmitting means to atmosphere in a second position thereof or to allow no flow at all to or from said force transmitting means in a third position of said valve means;

means operatively connected to said valve means for cause said valve means to be at said third position thereof when said frames are a predetermined distance apart, at said first position thereof when said frames are closer together than said predetermined distance and at said second position when said frames are farther apart than said predetermined distance;

accumulator means in fluid communication with said valve means and said force transmitting means for increasing the effective fluid volume of said force transmitting means thereby driving the natural frequency of the force transmitting means below the natural excitation frequency imposed upon one of said frames; and fluid flow means connected between said force transmitting means and said accumulator for allowing fluid to exit from said force transmitting means to said accumulator means at a faster rate than fluid can enter said force transmitting means from said accumulator means.

15. Apparatus as defined in claim 14 wherein said accumulator means has a fixed constant volume.

* * * * *